United States Patent Office 2,712,537
Patented July 5, 1955

2,712,537
POLYMERIZATION PRODUCTS OF PYRIMIDYL AMIDES OF BETA-CYANO-ACRYLIC ACIDS

Gaetano F. D'Alelio, Pittsburgh, Pa., assignor to Koppers Company, Inc., a corporation of Delaware No Drawing. Continuation of application Serial No. 244,708, August 31, 1951. This application June 26, 1953, Serial No. 364,514

16 Claims. (Cl. 260—80.5)

This invention relates to new monomers and to new polymeric materials derived therefrom and is particularly directed to the polymerization products obtained by polymerizing a mass comprising as a new monomer a pyrimidyl amide of beta-cyano-acrylic or beta-cyano-methacrylic acid in the presence or absence of other ethylenic copolymerizable compounds especially acrylonitrile. The invention also relates to compositions of these polymerization products adapted to the formation of shaped articles, in many cases to molecularly oriented shaped articles, particularly to fibers, threads, bristles, monofilaments, etc., hereinafter referred to as fibers, and other shaped articles such as films and the like, which articles show improved dyeing properties.

It has been known for some time that certain copolymers of acrylonitrile may be adapted to the preparation of shaped articles, such as, films, fibers, foils, tubes, etc. Some of these copolymers have been regarded as capable of being cold-drawn to produce structures molecularly oriented along the fiber axis. Cold-drawing may be defined as the stretching of a polymeric material at a temperature below the melting point of the material to give a molecularly oriented structure.

The resistance of acrylonitrile polymers to dyes of all types has presented serious dyeing problems, especially in the development of synthetic fibers from these polymers. In fact, in order to dye polyacrylonitrile one commercial process resorts to the use of high pressures with water solutions or organic dispersions of dyes. It has been proposed that improvement in dye susceptibility can be obtained by the use of itaconic acid in small amounts as copolymerizing monomer in the preparation of acrylonitrile polymers. However, the polymer products obtained thereby have a tendency to crosslink upon standing at temperatures of at least about 70–80° C. or upon spinning from hot solutions. Such crosslinking causes spoliation of material by gelation during storage, embrittlement of fibers, fouling of spinning jets, and other production difficulties.

In accordance with the present invention it has now been found that improvements in dyeing properties of acrylonitrile polymers are obtained by the polymerization of monomeric masses comprising acrylonitrile and a pyrimidyl amide of beta-cyano-acrylic or beta-cyanomethacrylic acid with or without other copolymerizable ethylenic compounds. It has been found further that in addition to the fact that the pyrimidyl amides of beta-cyano-acrylic and beta-cyano-methacrylic acid yield particularly valuable copolymers with acrylonitrile, they can also be used effectively to form copolymers with other types of copolymerizable ethylenic compounds having a $CH_2=C<$ group. Thus it has been found that valuable polymerization products can be prepared in accordance with the invention by polymerizing a mass comprising a pyrimidyl amide of beta-cyano-acrylic or beta-cyanomethacrylic acid in the presence of other ethylenic polymerizable compounds such as acrylonitrile and the other polymerizable ethylenic compounds listed hereinafter.

The amides used in the practice of the invention are formed by reacting an amide-forming pyrimidine, i. e. an amino pyrimidine having a replaceable N-hydrogen with beta-cyano-acrylic acid or beta-cyano-alpha-methyl acrylic acid, and the acryl chlorides and anhydrides thereof. For example, N-(2,6-dimethyl-4-pyrimidyl) beta-cyano-acrylamide, which for reasons of economy and ease of preparation, is usually preferred and has the formula

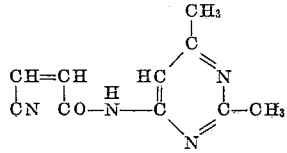

and is prepared simply by reacting beta-cyano-acrylic anhydride or beta-cyano-acrylic chloride with 4-amino-2,6-dimethyl pyrimidine which in turn is prepared by condensing three mols of acrylonitrile as described, for example, in U. S. Patent 2,540,826, below. The corresponding beta-cyano-methacrylamide is prepared by using beta-cyano-methacrylic anhydride or beta-cyanomethacrylic chloride in place of acrylic anhydride or methacrylic chloride. The acid chloride and anhydride are sufficiently reactive to form the amide merely upon mixing at room temperature. In some cases where the acid chloride or anhydride is not as reactive or in order to get more complete reaction, gentle heating may be advantageous.

The pyrimidyl amides of beta-cyano-acrylic or beta-cyano-methacrylic acid are represented by the general formula

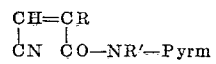

in which R is hydrogen or the methyl group; R' is hydrogen or an alkyl group, such as methyl, ethyl, isopropyl, n-butyl, sec-butyl, amyl, hexyl, decyl, and the like, preferably containing less than four carbon atoms; and pyrm is a pyrimidine nucleus. The pyrimidine nucleus may be substituted or unsubstituted as in the case of 4-amino-pyrimidine, 4-amino-2,6-dimethyl-pyrimidine, 4-amino-2,6-diethyl-5-methyl-pyrimidine and like amino pyrimidines. Other suitable pyrimidines and methods for their manufacture are given by Larchar, U. S. Patent 2,540,826 and Brown, J. Soc. Chem. Ind. 69, 353+ (1950). If substituted it is preferred that the substituents shall be alkyl groups as listed above, but preferably containing not more than a total of five carbon atoms.

The proportions of the amide in the polymerization products of the invention can vary over a wide range, ranging from equimolar proportions of amide down to very small amounts of amide such as may be employed in acrylonitrile polymers to impart dye susceptibility thereto. Although even smaller amounts are somewhat effective, the improvement in susceptibility of acrylonitrile copolymers to dyes becomes particularly noticeable when the amide content of the copolymer is about 0.1 per cent and increases as the amount of amide is increased. Ordinarily sufficient improvement in dye susceptibility is obtained with amounts of amide ranging up to about 10 or 15 per cent but it may be advantageous for reasons such as in the preparation of ion exchange polymers or additives to improve dyeing properties to have a larger proportion of amide in the acrylonitrile copolymer. In such cases the concentration of amide can range up to or approaching 50 mol per cent. Within these proportions acrylonitrile copolymers of the invention show great affinity toward many dyes especially basic, acidic, vat, and cellulose acetate dyes.

In addition to the improvements effected in the resulting copolymers, the use of pyrimidyl amides of beta-cyano-acrylic or beta-cyano-methacrylic acid has certain other advantages over the use of the acids. For example, the amides are more soluble in acrylonitrile than the acids. Therefore it is generally easier to get complete copolymerization of the amide with acrylonitrile in solution, emulsion and suspension polymerizations.

The acrylontrile copolymers discussed herein are soluble in N,N-dimethyl acetamide (DMA), N,N-dimethyl formamide (DMF), butyrolactone, ethylene carbonate, N,N-dimethyl methyl urethane of the formula $(CH_3)_2NCOOCH_3$, ethylene carbamate, N-methyl-2-pyrolidone, and a number of similar solvents, used alone or in conjunction with N,N-dimethyl cyanamide, N,N-dimethyl cyano-acetamide, N,N-dimethyl methoxy-acetamide, methylene dinitrile, methylene di-thiocyanate, formyl caprolactam, formyl morpholine, tetra-methylene sulfone, etc. Nitroalkanes, such as nitromethane, may be used as solvents for such copolymers having no more than about 85 per cent acrylonitrile, providing the comonomers used in preparing such copolymers do not have substituent groups of equal or greater secondary bonding force than the cyano groups in acrylonitrile. Copolymers of the present invention which have high proportions of monomers of relatively low secondary-valence bonding strength, such as vinyl chloride, may often be dissolved in acetone or mixtures of acetone and solvents of the above types.

This invention will be more fully described by the following examples which illustrate methods of practicing the invention. In these examples and throughout the specification, "parts" and "percentages" are intended to mean parts by weight and percentages by weight.

Example I 23.1 grams (0.2 mol) beta-cyano-acryl chloride is added slowly and with stirring to a mixture of 21.8 grams (0.2 mol) 4-amino-2,6-dimethyl pyrimidine and 150 ml. diethyl ether in a flask equipped for reflux. Upon completion of addition of the acid chloride the mixture is refluxed for approximately ½ hour. The ether is then evaporated and the residue dissolved in water and shaken with 29.0 grams (0.125 mol) silver oxide to remove the chloride ion. The mixture is filtered and the filtrate evaporated to dryness. The residue is recrystallized from absolute ethanol. There is obtained N-(2,6-dimethyl-4-pyrimidyl)-beta-cyano-acrylamide.

Ultimate analyses for carbon, hydrogen and nitrogen and molecular weight determinations on the product give results which are in close agreement with the theoretical values for N-(2,6-dimethyl-4-pyrimidyl)-beta-cyano-acryl amide.

Substitution of equivalent quantities of beta-cyano-methacrylic chloride or of various amino pyrimidines as described above respectively in the foregoing procedure yields the various pyrimidyl beta-cyano-acryl amides and beta-cyano-methacryl amides of this invention which are characterized by ultimate analyses and molecular weight determinations as described in the foregoing procedure.

Example II

Five polymers of acrylonitrile are prepared from the following monomer compositions

| Polymer | Acrylonitrile | N-(2,6-dimethyl-4-pyrimidyl) beta-cyano-acrylamide |
|---|---|---|
| | Parts | Parts |
| A | 100 | |
| B | 99.9 | 0.1 |
| C | 95 | 5.0 |
| D | 90 | 10.0 |
| E | 80 | 20.0 |

To 900 parts of water, adjusted to a pH of about three, in a suitable reactor, is added 1.0 part of ammonium persulfate, 0.5 part of sodium bisulfite, and 100 parts of monomer or monomer mixture. The reactor is then flushed with deoxygenated nitrogen and heated with agitation to 50° C. for 24 hours. Steam is introduced into the reactor to remove unpolymerized monomers from the mixture. A small amount of aluminum sulfate is added to the mixture and the polymer isolated by filtration.

The polymer is then washed with water and with methyl alcohol. A portion of the polymer is dissolved in dimethyl formamide, ethylene carbonate, or butyrolactone and a film cast from the solution. The film is washed entirely free of solvent and stretched at a ratio of about 8:1 in a glycerine bath containing 0.05 part of 1,5-diamino-4,8-dihydroxyanthraquinone-3-sulfonic acid, 0.03 part sulfuric acid and 50 parts water (50:1 bath-film ratio) at boiling temperature for one hour. The film is then removed and washed with water and scoured for 15 minutes in a 0.4 per cent soap solution at 85° C. Whereas the unmodified polyacrylonitrile dyed in this manner has little or no color, all of the copolymers are dyed to a deeper blue shade.

Fibers are spun from the same solutions either by dry spinning, or by wet spinning. The fibers are substantially freed from solvent and dried. After cold-drawing the dried fibers 600–900 per cent at 120–145° C. and subsequently heat-treating them at 150° C. for one hour, the fibers are given the same dyeing and washing treatment described above with the same results as for the films, a light tint being acquired by the unmodified polyacrylonitrile fibers and a deep and dense color being given to the copolymer fibers. The polymers of this example are also soluble in dimethyl formamide, dimethyl acetamide, tetramethyl urea, butyrolactone, formyl morpholine, etc.

Example III

Five parts of the copolymer fiber C of Example II is dyed to a green shade using the vat color, dimethoxydibenzanthrone, at 70° C. in a bath containing 0.5 part of dye, 0.2 part sodium hydroxide, 0.5 part sodium hydrosulfite and 100 parts of water (20:1 bath-fiber ratio). After the first 15 minutes of heating, 0.25 part of Glauber's salt was added. The fiber sample is then oxidized in a 0.5 per cent sodium dichromate 1.0 per cent acetic acid aqueous solution at 70° C. for 30 minutes in a 20:1 bath-fiber ratio. The dyed fiber is then scoured in a 0.5 per cent boiling soap solution. A sample of yarn prepared from the unmodified acrylonitrile polymers and dyed under the same conditions acquires only a light shade of color.

When 1,5-di-p-anisoylamino-4,8-dihydroxyanthraquinone is used as the vat dye, the fiber is dyed a strong violet color.

Example IV

The procedure of Example II is repeated for the polymerization of the following monomer compositions

| Polymer | Acrylonitrile | Vinyl Chloride | N-(2,6-dimethyl-4-pyrimidyl) beta-cyano-methacrylamide | Copolymer Soluble in |
|---|---|---|---|---|
| | Parts | Parts | Parts | |
| A | 92 | 5 | 3 | DMF, DMA, etc. |
| B | 87 | 10 | 3 | DMF, DMA, etc. |
| C | 82 | 15 | 3 | DMF, DMA, etc. |
| D | 77 | 20 | 3 | $NO_2Me$. |
| E | 57 | 40 | 3 | $NO_2Me$. |
| F | 37 | 60 | 3 | Acetone. |

Sometimes copolymers D and E, when dissolved in nitromethane may have gelled, partially dissolved particles known as fisheyes. In such cases, the solubility can be improved by the addition of small amounts of materials which are good solvents for acrylonitrile polymers, such as butyrolactone, ethylene carbonate, dimethyl formamide, dimethyl acetamide, tetramethyl urea, etc. In addition, certain materials which are relatively poor solvents for polyacrylanitrile, such as diethyl formamide, diethyl acetamide, diethyl propionamide, etc., can be added to improve the solubility. Also, when acetone solutions of copolymer F contain gelled particles, clarification of the solution can be effected by the addition of nitromethane, diethyl formamide, diethyl acetamide, etc.

Dyeing tests of these copolymers show improvements in dyeing susceptibility similar to those of Example II.

*Example V*

The procedure of Example II is repeated for the polymerization of the following monomer compositions

| Polymer | Acrylonitrile | Styrene | N-(2,6-dimethyl-4-pyrimidyl) beta-cyano-acrylamide |
|---|---|---|---|
| | Parts | Parts | Parts |
| A | 88 | 7 | 5.0 |
| B | 78 | 17 | 5.0 |
| C | 68 | 27 | 5.0 |
| D | 58 | 37 | 5.0 |

Dyeing tests of these copolymers show improvements in dye susceptibility similar to Example II. In place of styrene, various styrene derivatives can be used, such as alpha-methyl-styrene; nuclear-substituted chloro-styrenes, i. e., ortho-, meta-, and para-chloro-styrenes, dichloro-styrenes, for example, the 2,3-, 2,4-, 2,5-, 2,6-, 3,4-, and 3,5 - dichlorostyrenes trichloro - styrenes; cyano - styrenes, such as ortho-, meta-, and para-cyano-styrenes, dicyano-styrenes; nuclearly-substituted alkyl-styrenes, such as mono- and di-methyl-styrenes, mono- and di-ethyl-styrenes, mono- and di-isopropyl-styrenes; aryl-substituted styrenes, i. e., para-phenyl-styrene, etc., cyclo-aliphatic-substituted styrenes, such as para-cyclohexyl-styrene; fluoro-styrenes, such as ortho-, meta-, para-fluoro-styrene, difluoro-styrenes, etc.; trifluoro-methyl-styrenes, such as ortho-, meta-, and para-trifluoromethyl-styrenes, di-(trifluoromethyl)-styrenes, and various other styrenes or mixtures of any number of these with each other or with styrene.

*Example VI*

The procedure of Example II is repeated for the polymerization of the following monomer compositions

| Polymer | Acrylonitrile | Vinylidene Chloride | N-(2,6-diethyl-5-methyl-4-pyrimidyl) beta-cyano-acrylamide | Copolymer Soluble in |
|---|---|---|---|---|
| | Parts | Parts | Parts | |
| A | 85 | 5 | 10 | DMF, DMA, etc. |
| B | 65 | 25 | 10 | DMF, DMA, etc. |
| C | 45 | 45 | 10 | DMF, DMA, etc. |
| D | 25 | 65 | 10 | DMF, DMA, etc. |
| E | 5 | 85 | 10 | DMF, DMA, etc. |

With the above vinylidene chloride copolymers and similar copolymers having a total of acrylonitrile and vinylidene chloride of a least 85 per cent in the polymer molecules, only the more active solvents, such as butyrolactone, ethylene carbonate, N,N-dimethyl acetamide, N,N-dimethyl formamide, N,N,N',N'-tetramethyl urea, etc., can be used as solvents. The above copolymers dye more readily and thoroughly than similar copolymers containing no amide.

*Example VII*

The procedure of Example II is repeated for the polymerization of the following monomer compositions

| Polymer | Acrylonitrile | Vinylidene Chloride | Vinyl Chloride | N-(2,6-dimethyl-4-pyrimidyl) beta-cyano-acrylamide |
|---|---|---|---|---|
| | Parts | Parts | Parts | Parts |
| A | 80 | 10 | 8 | 2 |
| B | 70 | 20 | 8 | 2 |
| C | 70 | 15 | 13 | 2 |
| D | 50 | 20 | 28 | 2 |
| E | 20 | 18 | 60 | 2 |

The dyeing tests of the copolymer products show dye susceptibility similar to the copolymers of Example II.

Instead of copolymerizing the amides of this invention directly with acrylonitrile, the amides can first be copolymerized with part of the acrylonitrile or with another monomer and this independently prepared copolymer used to modify polyacrylonitrile or acrylonitrile copolymers. These modifying-copolymers can be prepared substantially in accordance with the procedure of Example II and thereafter placed in solution and added to a solution of polyacrylonitrile, so that a composition consisting of sufficient polymeric amide results and satisfactory dyeing is obtained. As examples, polymers D and E of Example II may be used as modifiers for the unmodified homopolymers and copolymers of acrylonitrile. For example, polymer E of Example II, which consists of 80 parts of acrylonitrile and 20 parts of amide has excellent compatibility with homopolymers of acrylonitrile. The overall amounts of amide required to improve the dyeability generally corresponds to the amounts indicated above for copolymers in which the main body of the acrylonitrile polymers contain the amide copolymerized directly therein, that is, at least about 0.1 per cent and up to 5 per cent or even 15 per cent or higher of amide in the ultimate polymer mixture. The following example is illustrative.

*Example VIII*

A 10 per cent solution of polymer E of Example I, which consists of 80 parts of acrylonitrile and 20 parts of N-(2,6-dimethyl-4-pyrimidyl) beta-cyano-acrylamide, is prepared in dimethyl formamide and added to a dimethyl formamide solution of polyacrylonitrile, containing 20 per cent polymer, so that a composition consisting of 90 parts of polyacrylonitrile and 10 parts of the pyrimidyl beta-cyano-acrylamide copolymer is obtained so as to give an ultimate polymer composition of 98 parts acrylonitrile and 2 parts pyrimidyl amide. The solution is heated to 130° C., after which the solution is filtered. Films and fibers prepared from this mixture are dyed in accordance with the process of Example II, and satisfactorily dyed, shaped articles are obtained. The unmodifier polyacrylonitrile without the addition of the pyrimidyl beta-cyano-acrylamide copolymer shows little or no dye retention.

In many cases, it is desirable to use amide-acrylonitrile copolymers which have even a higher ratio of the amide as, for example, 50 to 70 parts of the amide copolymerized with acrylonitrile or methacrylonitrile and even these copolymers of higher amide proportions have good compatibility with acrylonitrile polymers. In other cases, the copolymers of pyrimidyl amides of beta-cyano-acrylic or beta-cyano-methacrylic acid with other monomers are satisfactory, such as, for example, copolymers of styrene, vinyl chloride, vinylidene chloride, alpha-methyl-styrene, etc.

When it is desired to modify an acrylonitrile copolymer such as the copolymer of acrylonitrile and styrene or the copolymers of acrylonitrile and other copolymerizable ethylenic compounds, it is usually desirable to use as modifiers copolymers containing at least one structural unit present in the acrylonitrile copolymer. Thus as there are present in the acrylonitrile copolymer, structural units derived from the acrylonitrile and styrene, it is desirable to have present in the modifying copolymer structural units derived from styrene and/or acrylonitrile, advantageously both, in addition to those derived from the amide. By thus including in the modifying copolymers structural units of the same type as the structural units of the copolymer to be modified, greater compatibility between the acrylonitrile copolymer to be modified and the modifying copolymer is obtained and the two are more readily soluble in the mutual solvent and will more readily mix into homogeneous polymer mixtures.

The polymerization products of the present invention have in the polymer molecule a plurality of repeating units of the formula

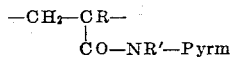

in which R, R', and pyrm are substituents of the type indicated above and will contain additional repeating units of the formula

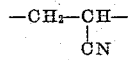

when the amide is copolymerized with acrylonitrile.

In addition, the polymerization products can contain any number of repeating units of the type obtained by the copolymerization of a pyrimidyl amide of a beta-cyano-acrylic acid or beta-cyano-methacrylic acid or a mixture of this amide and acrylonitrile with one or more copolymerizable ethylenic compounds, such as, for example, vinylidene chloride, vinyl chloride, styrene, alpha-methyl-styrene and methacrylonitrile. When the polymerization mass contains, in addition to the pyrimidyl amide, a polymerizable monomer having a $CH_2=C<$ group in an amount such that the latter is present to an extent of at least 50 mol per cent of the overall monomer content, then such monomers as fumaronitrile, beta-cyano-acrylamide and methyl beta-cyano-acrylate may also be present in the polymerization mixture.

As previously indicated, the solvent resistance of such copolymers as contain one or more monomer units in addition to those formed by the acrylonitrile and the amides of the invention is affected by the type and proportion of copolymerizing monomer or monomers used to replace part of the acrylonitrile. For example, copolymers containing small amounts of the amide units may contain various proportions of such monomer units as obtained from vinylidene chloride, methacrylonitrile, fumaronitrile, and beta-cyano-acryl amide without considerable reduction in solvent resistance. Replacement of acrylonitrile units in the copolymers by vinyl chloride, styrene and alpha-methyl-styrene units result in copolymers of lowered solvent resistance, the amount of such lowering in resistance in each case depending on the amount substituted. In addition to the solvent resistance, certain other physical properties of the copolymers are affected by the presence of these additional units in the copolymers. The amount and character of the changes in physical properties of these copolymers depend again on the type and proportion of copolymerizing monomer or monomers used. For example, the tensile strength of an acrylonitrile-amide type copolymer will decrease much more when a monomer having relatively weak secondary bonding forces, such as styrene or ethylene is used to replace part of the acrylonitrile than when one or more monomers having relatively strong bonding forces, such as methacrylonitrile, fumaronitrile, beta-cyano-acryl amide, methyl beta-cyano-acrylate and vinylidene chloride, is used to replace part of the acrylonitrile. Moreover, the ability of these copolymers to form molecularly oriented shaped articles depends on the type and amount of the copolymerizing monomer or monomers used to replace acrylonitrile.

Other copolymerizable ethylenic compounds, which can also be present in the polymerizable masses for copolymerization and the amides used in the practice of this invention include one or more of the following: acrylates, e. g. methyl acrylate; methacrylates, e. g. methyl methacrylate; acrylamides; methacrylamides; vinyl esters, such as vinyl acetate; itaconic diesters, such as dimethyl and diethyl itaconates; itaconamide; vinyl halides, such as vinyl fluoride, vinylidene fluoride, tetrafluoroethylene, trifluorochloroethylene; vinyl aryls, such as vinyl naphthalenes and the nuclear-substituted styrenes listed in Example IV, etc.

The polymerization products of this invention can be prepared by various polymerization systems, such as emulsion, suspension, mass and solution polymerizations. In addition to the monomers, the polymerizable mass can also contain other materials such as catalysts, e. g. peroxides, such as benzoyl peroxide, naphthyl peroxides, phthalyl peroxide, tertiary-butyl perbenzote, etc., azo catalysts, persulfates, such as ammonium persulfate, etc., solvents, suspension or emulsion media, emulsifying agents, suspension agents, plasticizers, lubricants, etc.

For use in the preparation of shaped articles, the polymerization products of this invention have molecular weights preferably of at least about 10,000. However, polymerization products of molecular weights less than 10,000 can be used for other purposes, such as impregnants, solvent resistant coatings, etc. The molecular weight of the polymerization products is dependent on the concentrations of the monomers, the amount and type of catalyst, the temperature of reaction, etc.

As is quite generally known in the field of high polymers, molecular orientation is usually indicated and identified by birefringence of polarized light, as under Nicol prisms, by increased density as compared to the density of the same polymer unoriented, and by characteristic X-ray diffraction patterns. When a material is crystalline or oriented, its X-ray diagram shows bright areas as spots for points of crystallization and dark areas for the non-crystalline regions. The intensity or number of these bright spots increases with the degree of orientation or crystallization. Amorphous or non-crystalline materials give X-ray diagrams having very few high lights or bright spots whereas crystalline or oriented materials give definite X-ray diffraction patterns. In these patterns there are definite relationships of the bright spots with regard to position and spacing which are generally characteristic of the composition of the material being X-rayed. In fibers or films the orientation usually follows the direction of drawing or stretching so that the orientation is parallel to the fiber axis or a major surface.

Useful fibers can be made from the solutions of the copolymers of this invention by dry spinning, as in the preparation of cellulose acetate fibers, or by wet spinning, as in the preparation of viscose rayon. In wet spinning, the solution of copolymer may be spun into a substance which is a non-solvent for the copolymer, but which is advantageously compatible with the solvent in which the copolymer is dissolved. For example, water, acetone, methyl alcohol, carbon disulfide, glycerine, chloroform, carbon tetrachloride, benzene, etc., can be used as a precipitating bath for N,N-dimethyl acetamide, N,N,N',N'-tetramethyl urea, butyrolactone, ethylene carbonate, and other solvent compositions of these copolymers. The extruded fibers, from which substantially all of the solvent has been removed in the spinning step, about 1–10 per cent remaining in the shaped article, can then be cold-drawn about 100–900 per cent, preferably about 300–600 per cent; and the drawn fiber heat-treated, usually at substantially constant length, at about 100–160° C. to effect further crystallization and removal of the remaining solvent. The term "heat-treated," as used herein, refers to the application of heat to an object, usually at a controlled temperature and usually by means of the medium surrounding the object.

Many of the acrylonitrile copolymers of this invention may be molecularly oriented, especially if there is no more than 15 per cent of amide in the copolymer molecule. This is true when the major portion of the copolymer is acrylonitrile, for example 85 per cent or more acrylonitrile, or when the other copolymerizing monomers used in making such copolymers have substituent groups having secondary-valence bonding forces equal to or greater than exhibited by the cyano group in acrylonitrile. For example, if such monomers as methacrylonitrile, fumaronitrile, vinylidene chloride, beta-cyano-acrylamide and methyl beta-cyano-acrylate are used with acrylonitrile and an amide according to the invention, the proportion of acrylonitrile in the copolymers can be much less than 85 per cent without destroying the capacity for molecular orientation. Molecularly oriented, cold-drawn, shaped articles of particular usefulness are prepared from copolymer compositions containing in the polymer molecules 60–99.9 per cent acrylonitrile, 0.1–15 per cent, advantageously 0.1–5 per cent, the amide, with or without one or more monomers of the class consisting of vinylidene chloride, vinyl chloride, styrene, alpha-methyl-styrene, methacrylonitrile, fumaronitrile, beta-cyano-acryl amide and methyl beta-cyano-acrylate, the effects of the presence of the monomers of this class being noticeable when the monomer is present in the polymer molecule in amounts of one per cent or more.

The polymerization products of this invention show great affinity for the acetate, acidic and vat dyes. The cellulose acetate dyes which are effective with these polymerization products are mainly amino anthraquinone derivatives. A number of other acidic dyes that can be used are anthranilic acid→ 1-(4′-sulfophenyl)-3-methyl-5-pyrazolone; 1,5-diamino-4,8-dihydroxyanthraquinone-3-sulfonic acid; 1-aminonaphthalene-4-sulfonic acid→ alphanaphthol-4-sulfonic acid; the sodium salt of sulfanilic acid→ aniline→ 2-benzoyl-amino-5-naphthol-7-sulfonic acid; the sodium salt of 4,4′-diaminostilbene-2,2′-di-sulfonic acid ⇉ (phenol)₂ ethylated; 1,5-di-amino-4,8-dihydroxyanthraquinone-3-sulfonic acid; dye prepared by diazotizing 1-aminonaphthalene-4-sulfonic acid and coupled with alpha-naphthol-4-sulfonic-acid; the sodium salt of (m-amino-benzoic acid→ o-anisidine) phosgenated; the sodium salt of (2-naphthol-6,8-disulfonic acid←benzidine→phenol) ethylated; dimethoxy-dibenanthrone; and 1,5-di-p-anisoylamino-4,8-dihydroxy-anthraquinone.

From the molecularly orientable copolymers of this invention fibers can be prepared having improved dyeing properties, low shrinkage in boiling water, sometimes as low as 3 to 5 per cent or less of the cold-drawn or stretched article, good heat-resistance, and tensile strength in the order of 4 to 6 grams per denier. Moreover, these properties make the fibers desirable in the manufacture of hosiery and for such all-purpose fabrics as used for blouses, shirts, suits, etc.

This application is a continuation of my application Serial No. 244,708, filed August 31, 1951, now abandoned.

What is claimed is:

1. A polymeric composition having in the polymer molecule a plurality of acid-reactive units having the formula

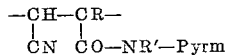

in which R is selected from the class consisting of hydrogen and the methyl radical; R′ is selected from the class consisting of hydrogen and alkyl groups and pyrm is selected from the class consisting of the groups 4-pyrimidyl and alkyl substituted 4-pyrimidyl in which the alkyl substituents contain a total of not more than five carbon atoms.

2. The polymeric composition of claim 1 in which the pyrimidine group is unsubstituted.

3. The polymeric composition of claim 2 which contains in the polymer molecule a plurality of repeating units of the formula

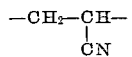

4. The polymeric composition of claim 1 which contains in the polymer molecule a plurality of repeating units of the formula

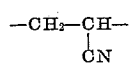

5. A polymeric composition having in the polymer molecule a plurality of repeating acid-reactive units having the formula

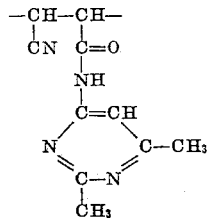

6. The polymeric composition of claim 5 which contains in the polymer molecule a plurality of repeating units of the formula

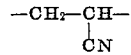

7. A cold-drawn shaped article having molecular orientation and dye susceptibility to acid dyes, said article comprising a copolymer of acrylonitrile and an amide having the following formula

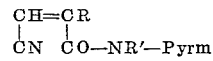

in which R is selected from the class consisting of hydrogen and the methyl radical; R′ is selected from the class consisting of hydrogen and alkyl groups and pyrm is selected from the class consisting of the groups 4-pyrimidyl and alkyl substituted 4-pyrimidyl in which the alkyl substitutents contain a total of not more than five carbon atoms, said copolymer having a molecular weight of at least about 10,000 and containing in the polymer molecule no more than about 15 per cent by weight of the amide.

8. A cold-drawn fiber having molecular orientation and dye susceptibility to acid dyes, said fiber comprising a copolymer of acrylonitrile and N-(2,6-dimethyl-4-pyrimidyl) amide of an acid selected from the class consisting of beta-cyano-acrylic and beta-cyano-methacrylic acids, said copolymer having a molecular weight of at least about 10,000 and containing in the polymer molecule no more than about 15 per cent by weight of said amide.

9. A cold-drawn fiber having a molecular orientation and dye susceptibility to acid dyes, said fiber comprising a copolymer of about 60–98.9 per cent by weight acrylonitrile, about 0.1 to 5 per cent by weight N-(2,6-dimethyl-4-pyrimidyl) beta-cyano-acrylamide, and about 1 to 39.9 per cent by weight of a compound selected from the class consisting of vinyl chloride, vinylidene chloride, styrene, alpha-methyl-styrene, methacrylonitrile, fumaronitrile, beta-cyano-acryl amide, and methyl beta-cyano-acrylate.

10. A cold-drawn fiber having molecular orientation and dye susceptibility to acid dyes, said fiber comprising a copolymer of about 60–98.9 per cent by weight acrylonitrile, about 0.1 to 5 per cent by weight N-(2,6-dimethyl-4-pyrimidyl) beta-cyano-acrylamide, and about 1 to 39.9 per cent by weight vinylidene chloride.

11. A cold-drawn fiber having molecular orientation and dye susceptibility to acid dyes, said fiber comprising a copolymer of about 60–98.9 per cent by weight acrylonitrile, about 0.1 to 5 per cent by weight N-(2,6-dimethyl-4-pyrimidyl) beta-cyano-acrylamide, and about 1 to 39.9 per cent by weight vinyl chloride.

12. A cold-drawn fiber having molecular orientation and dye susceptibility to acid dyes, said fiber comprising a copolymer of about 60–98.9 per cent by weight acrylonitrile, about 0.1 to 5 per cent by weight N-(2,6-dimethyl-4-pyrimidyl) beta-cyano-acrylamide, and about 1 to 39.9 per cent by weight styrene.

13. As a new monomeric composition of matter a compound having the formula

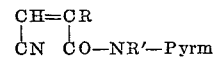

in which R is selected from the class consisting of hydrogen and the methyl radical; R' is selected from the class consisting of hydrogen and alkyl groups and pyrm is selected from the class consisting of the groups 4-pyrimidyl and alkyl substituted 4-pyrimidyl in which the alkyl substituents contain a total of not more than five carbon atoms.

14. As a new monomeric composition of matter a compound having the formula

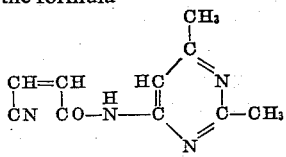

and about 1 to 39.9 per cent by weight of a compound selected from the class consisting of vinyl chloride, vinylidene, chloride, styrene, alpha-methyl-styrene, methacrylonitrile, fumaronitrile, beta-cyano-acrylamide, and methyl beta-cyano-acrylate.

15. As a new monomeric composition, N-(2,6-dimethyl-4-pyrimidyl) beta-cyano-acrylamide.

16. As a new monomeric composition, N-(2,6-dimethyl-4-pyrimidyl) beta-cyano-methacrylamide.

References Cited in the file of this patent

UNITED STATES PATENTS 2,643,990    Ham _____ June 30, 1953